(12) United States Patent
Bennett, III et al.

(10) Patent No.: US 7,180,995 B2
(45) Date of Patent: Feb. 20, 2007

(54) METHOD AND APPARATUS FOR DEMONSTRATING TELECOMMUNICATIONS PRODUCTS

(75) Inventors: Raymond Walden Bennett, III, Naperville, IL (US); Robert Wesley Bossemeyer, Jr., St. Charles, IL (US); Michael Steven Pickard, Highland Park, IL (US); Jordan Howard Light, Chicago, IL (US); Barry James Sullivan, Long Grove, IL (US); Edmond W. Israelski, Lake Barrington, IL (US); Denise Violetta Kagan, Riverwoods, IL (US); Richard Peter Krupka, Barrington, IL (US); Jose M. Cruz, Naperville, IL (US); Philip Martin Stebbings, Aurora, IL (US); Bruce Edward Stuckman, Algonquin, IL (US)

(73) Assignee: SBC Properties, L.P., Reno, NV (US)

( * ) Notice: Subject to any disclaimer, the term of this patent is extended or adjusted under 35 U.S.C. 154(b) by 210 days.

(21) Appl. No.: 11/067,843

(22) Filed: Feb. 28, 2005

(65) Prior Publication Data

US 2005/0169455 A1 Aug. 4, 2005

Related U.S. Application Data

(63) Continuation of application No. 10/386,885, filed on Mar. 12, 2003, now Pat. No. 6,876,739, which is a continuation of application No. 09/384,704, filed on Aug. 27, 1999, now Pat. No. 6,603,853.

(51) Int. Cl.
*H04M 3/00* (2006.01)
*H04M 5/00* (2006.01)
(52) U.S. Cl. .............................. 379/265.01; 379/265.09
(58) Field of Classification Search ................................ 379/265.01–265.14, 266.01–266.1, 309, 379/93.01
See application file for complete search history.

(56) References Cited

U.S. PATENT DOCUMENTS 6,072,946 A * 6/2000 Dooley et al. ................ 703/13

\* cited by examiner

*Primary Examiner*—William J. Deane, Jr.
(74) *Attorney, Agent, or Firm*—Toler Schaffer, LLP

(57) ABSTRACT

A telecommunication product demonstration system is comprised of three major components, including customer facility equipment, sales agent facility equipment, and telecommunication service simulation equipment. The system allows a sales agent to demonstrate various long distance services and telecommunications services to potential customers.

20 Claims, 1 Drawing Sheet

METHOD AND APPARATUS FOR DEMONSTRATING TELECOMMUNICATIONS PRODUCTS

CROSS REFERENCE TO RELATED APPLICATION

This application is a continuation of U.S. patent application Ser. No. 10/386,885, filed on Mar. 12, 2003, now U.S. Pat. No. 6,876,739 which is a continuation of U.S. patent application Ser. No. 09/384,704, filed on Aug. 27, 1999 and issued as U.S. Pat. No. 6,603,853.

TECHNICAL FIELD

The present invention relates generally to telecommunication systems and more particularly to a method and apparatus for demonstrating telecommunications products.

BACKGROUND ART

The telephone is one of the most widely used pieces of communication equipment in the world. At first, it was merely a convenient tool to allow people to communicate with each other without the necessity of being face-to-face and without the time log associated with written communication. Presently, in addition to performing communications functions, the telephone is a tool used to market products and services, provide technical support for consumer products, and, among other things, allow callers to access information such as their own financial data. Thus, the telephone is a major business, marketing and information resource.

When marketing telecommunication products and services, sales representatives discuss available services and attempt to align them with potential customer needs. Presently, the agent must use verbal descriptions to convey the benefits of the service to the potential customer. The agent can claim various benefits and attributes of the offered service such as superior sound quality or ease of use, but these sales propositions cannot be directly demonstrated. In other words, the problem is analogous to selling an automobile without allowing the potential buyer to test drive the vehicle.

The desire, therefore, is to provide an improved method and apparatus for demonstrating telecommunications products to potential customers. Preferably, the improved method provides a means for sales agents to provide potential customers with direct experience with the service.

BRIEF DESCRIPTION OF THE DRAWINGS

In order that the invention may be well understood, there will now be described some embodiments thereof, given by way of example, reference being made to the accompanying drawings, in which.

BEST MODES FOR CARRYING OUT THE INVENTION

Figure 1:
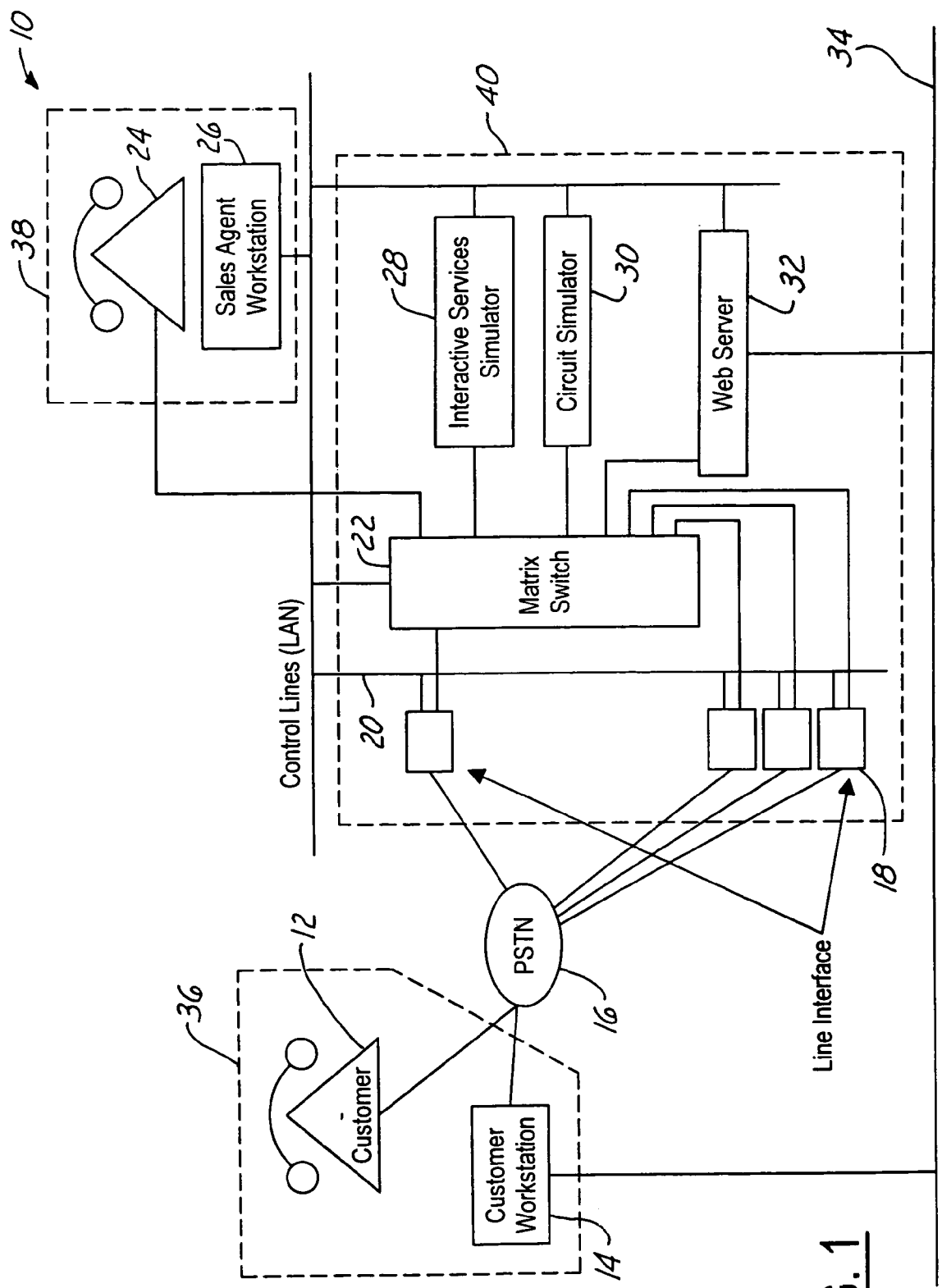
FIG. 1 is a block diagram of a telecommunication product demonstration system in accordance with one embodiment of the present invention.

Referring to FIG. 1, a block diagram of a telecommunication product demonstration system 10 in accordance with one embodiment of the present invention is illustrated. Telecommunication product demonstration system 10 comprises of three major components, including customer facility equipment 36, sales agent facility equipment 38, and telecommunication service simulation equipment 40.

Customer facility equipment 36 is located on a potential customer's premise and is coupled to public switched telecommunications network (PSTN) 16. Customer facility equipment 36 comprises of a customer telephone 12 coupled to PSTN 16 for providing telephone service to the customer and a customer workstation 14 such as a computer. In the preferred embodiment, customer workstation 14 has an Internet connection 34 and is coupled to PSTN 16.

Sales agent facility equipment 38 is located on the sales agent's premise and is coupled to telecommunication service simulation equipment 40. Sales agent facility equipment 38 comprises a sales agent telephone 24 for providing telephone service to the sales agent and a sales agent workstation 26. Sales agent workstation 26 is coupled to control line 20 and provides overall control of telecommunication service simulation equipment 40 for demonstration purposes.

Telecommunication service simulation equipment 40 is coupled to sales agent facility equipment 38 and PSTN 16. Telecommunication service simulation equipment 40 comprises a plurality of line interface modules 18, matrix switch 22, interactive services simulator 28, circuit simulator 30 and web server 32.

Line interface modules 18 are coupled to PSTN 16 and are controlled from sales agent workstation 26 or web server 32 via control lines 20. Line interface modules 18 are capable of sending signals to create a connection through PSTN 16. Line interface modules 18 could connect to an ordinary analog telephone line or they could be used with ISDN or similar digital networks.

Matrix switch 22 is coupled to line interface modules 18, sales agent telephone 24, interactive services simulator 28, circuit simulator 30 and web server 32. Matrix switch 22 is controlled from sales agent workstation 26 or web server 32 via control line 20 and allows the sales agent to speak to the potential customer through matrix switch 22 and a line interface module 18. Matrix switch 22 is a switch capable of connecting any number of lines on one side to any combination of lines on the other side. Typically, matrix switch 22 also provides automatic gain control and noise limiting in the same manner as a conference bridge.

Interactive services simulator 28 is coupled to matrix switch 22 and is controlled from sales agent workstation 26 or web server 32 via control line 20 and allows the sales agent to demonstrated various telecommunication services to a potential customer. Alternatively, system 10 could be configured to automatically demonstrate various telecommunication services to a potential customer when the potential customer calls some particular telephone number. Interactive services simulator 28 is capable of demonstrated a plurality of telecommunication services, including, voice mail, privacy manager, and talking call waiting.

Circuit simulator 30 is coupled to matrix switch 22 and is controlled from sales agent workstation 26 or web server 32 via control line 20 and allows the sales agent to demonstrate various long distance services to a potential customer. Circuit simulator 30 is capable of simulating a plurality of long distance services, including, conventional circuit switched services provided by various long distance companies, and packet switched services using varying degrees of compression provided over the Internet or other private Internet Protocol (IP) links.

Web server 32 is coupled to matrix switch 22 and Internet connection 34 allows remote control of line interface modules 18, matrix switch 22, interactive services simulator 28, and circuit simulator 30 via control line 20. Potential customers can access web server 32 via an Internet connection 34 and can interact with various services using customer workstation 14. In addition, a sales agent could be bridged onto the call at any time.

In operation, a sales agent controls matrix switch 22 and line interface modules 18 via control line 20 to establish a connection (call) between sales agent telephone 24 and customer telephone 12 via PSTN 16. The sales agent then discusses various telecommunications services such as, for example, long distance service with the potential customer. During their discussion the sales agent can control matrix switch 22 and circuit simulator 30 to demonstrate the simulated quality or features of different distance services. Alternatively, the sales agent can control matrix switch 22 and line interface modules 18 to demonstrate the quality or features actual distance services via PSTN 16.

The sales agent then discusses various other telecommunication services with the potential customer. The sales agent controls matrix switch 22 and interactive services simulator 28 to demonstrate each service. In the case of voice mail, interactive services simulator 28 allows the sales agent to invoke voice mail and to control it so that, for example, normal operation could be "paused" so the potential customer can be told about its capabilities at appropriate times. In the case of a service such as privacy manager, interactive services simulator 28 allows the sales agent to assist the potential customer to step through the service being demonstrated. In this manner, the customer has the chance to "test drive" each potential telecommunication service of interest.

In another aspect of the invention, interactive services simulator 28 may be used for automated demonstration of services. The potential customer could call telecommunication service simulation equipment 40 and/or connects to it via Internet connection 34. The interactive services simulator 28 then provides interactive voice response menus to guide the potential customer through the various services that can be demonstrated. In addition, web server 32 could provide demonstration of in-bound and out-bound services or synchronize with a telephone connection to provide feedback during service demonstration. Customer activity is tracked on sales agent workstation 26 for potential follow-up.

From the foregoing, it can be seen that there has been brought to the art a new and improved method and apparatus for demonstrating telecommunications products. It is to be understood that the preceding description of the preferred embodiment is merely illustrative of some of the many specific embodiments, that represent applications of the principles of the present invention. Clearly, numerous and other arrangements would be evident to those skilled in the art without departing from the scope of the invention as defined by the following claims:

What is claimed is:

1. A telephonic marketing system for telephonically demonstrating various telecommunications products and services to a potential customer via a first telephone in telephonic communication with a public switched telecommunications network, said telephonic marketing system comprising:

a matrix switch telephonically coupled to said public switched telecommunications network;

a simulator in telephonic communication with said matrix switch and operable to telephonically demonstrate a plurality of telecommunications services;

a second telephone in telephonic communication with said matrix switch and operable for use by a sales agent; and a computer workstation in electric communication with both said matrix switch and said simulator and operable for use by said sales agent;

whereby said potential customer can operate said first telephone and said sales agent can operate said second telephone so as to telephonically discuss at least one of said plurality of telecommunications services; and whereby said sales agent can operate said computer workstation to selectively control said matrix switch and said simulator so as to telephonically demonstrate at least one of said plurality of telecommunications services to said potential customer.

2. A telephonic marketing system according to claim 1, said telephonic marketing system further comprising:

a plurality of line interface modules both telephonically coupled in parallel between said public switched telecommunications network and said matrix switch and in electric communication with said computer workstation.

3. A telephonic marketing system according to claim 1, said telephonic marketing system further comprising:

a local area network in electric communication with said matrix switch, said simulator, and said computer workstation;

whereby said sales agent can operate said computer workstation so as to selectively control said matrix switch and said simulator via said local area network.

4. A telephonic marketing system according to claim 1, wherein said simulator comprises an interactive simulator operable to telephonically demonstrate a plurality of interactive telecommunications services.

5. A telephonic marketing system according to claim 4, wherein said plurality of interactive telecommunications services includes at least one service selected from the group consisting of voice mail, privacy manager, and talking call waiting.

6. A telephonic marketing system according to claim 1, wherein said simulator comprises a circuit simulator operable to telephonically demonstrate a plurality of long distance telecommunications services.

7. A telephonic marketing system according to claim 6, wherein said plurality of long distance telecommunications services includes at least one type selected from the group consisting of circuit-switched services and packet-switched services.

8. A telephonic marketing system according to claim 6, wherein said plurality of long distance telecommunications services includes packet-switched services, and wherein said circuit simulator has means for varying the degrees of compression of said packet-switched services.

9. A telephonic marketing system according to claim 1, wherein said simulator comprises both an interactive simulator operable to telephonically demonstrate a plurality of interactive telecommunications services and a circuit simulator operable to telephonically demonstrate a plurality of long distance telecommunications services.

10. A telephonic marketing system according to claim 1, said telephonic marketing system further comprising:

a web server in electric communication with said matrix switch, said simulator, said computer workstation, and the Internet;

whereby said potential customer can remotely access said telephonic marketing system so as to select at least one of said plurality of telecommunications services for automated demonstration.

11. A telephonic marketing system according to claim 10, wherein said computer workstation has means for tracking the activity of each said potential customer who remotely accesses said telephonic marketing system.

12. A telephonic marketing system for telephonically demonstrating various telecommunications products and services to a potential customer via a first telephone in telephonic communication with a public switched telecommunications network, said telephonic marketing system comprising:
  a matrix switch telephonically coupled to said public switched telecommunications network;
  an interactive simulator in telephonic communication with said matrix switch and operable to telephonically demonstrate a plurality of interactive telecommunications services;
  a second telephone in telephonic communication with said matrix switch and operable for use by a sales agent; and
  a computer workstation in electric communication with both said matrix switch and said interactive simulator and operable for use by said sales agent;
  whereby said potential customer can operate said first telephone and said sales agent can operate said second telephone so as to telephonically discuss at least one of said plurality of interactive telecommunications services; and
  whereby said sales agent can operate said computer workstation to selectively control said matrix switch and said interactive simulator so as to telephonically demonstrate at least one of said plurality of interactive telecommunications services to said potential customer.

13. A telephonic marketing system according to claim 12, said telephonic marketing system further comprising:
  a plurality of line interface modules both telephonically coupled in parallel between said public switched telecommunications network and said matrix switch and in electric communication with said computer workstation.

14. A telephonic marketing system according to claim 12, wherein said plurality of interactive telecommunications services includes at least one service selected from the group consisting of voice mail, privacy manager, and talking call waiting.

15. A telephonic marketing system according to claim 12, said telephonic marketing system further comprising:
  a web server in electric communication with said matrix switch, said interactive simulator, said computer workstation, and the Internet;
  whereby said potential customer can remotely access said telephonic marketing system so as to select at least one of said plurality of interactive telecommunications services for automated demonstration.

16. A telephonic marketing system for telephonically demonstrating various telecommunications products and services to a potential customer via a first telephone in telephonic communication with a public switched telecommunications network, said telephonic marketing system comprising:
  a matrix switch telephonically coupled to said public switched telecommunications network;
  a circuit simulator in telephonic communication with said matrix switch and operable to telephonically demonstrate a plurality of long distance telecommunications services;
  a second telephone in telephonic communication with said matrix switch and operable for use by a sales agent; and
  a computer workstation in electric communication with both said matrix switch and said circuit simulator and operable for use by said sales agent;
  whereby said potential customer can operate said first telephone and said sales agent can operate said second telephone so as to telephonically discuss at least one of said plurality of long distance telecommunications services; and
  whereby said sales agent can operate said computer workstation to selectively control said matrix switch and said circuit simulator so as to telephonically demonstrate at least one of said plurality of long distance telecommunications services to said potential customer.

17. A telephonic marketing system according to claim 16, said telephonic marketing system further comprising:
  a plurality of line interface modules both telephonically coupled in parallel between said public switched telecommunications network and said matrix switch and in electric communication with said computer workstation.

18. A telephonic marketing system according to claim 16, wherein said plurality of long distance telecommunications services includes at least one type selected from the group consisting of circuit-switched services and packet-switched services.

19. A telephonic marketing system according to claim 16, wherein said plurality of long distance telecommunications services includes packet-switched services, and wherein said circuit simulator has means for varying the degrees of compression of said packet-switched services.

20. A telephonic marketing system according to claim 16, said telephonic marketing system further comprising:
  a web server in electric communication with said matrix switch, said circuit simulator, said computer workstation, and the Internet;
  whereby said potential customer can remotely access said telephonic marketing system so as to select at least one of said plurality of long distance telecommunications services for automated demonstration.

* * * * *